United States Patent [19]

Ikoma et al.

[11] Patent Number: 4,937,089
[45] Date of Patent: Jun. 26, 1990

[54] TEXTURED PROTEINACEOUS FOOD

[75] Inventors: Mitugi Ikoma, Chiba; Masaru Harada, Kanagawa; Tsutomu Maruyama, Chiba, all of Japan

[73] Assignee: Kabushiki Kaisha Kibun, Tokyo, Japan

[21] Appl. No.: 251,977

[22] Filed: Sep. 29, 1988

Related U.S. Application Data

[63] Continuation-in-part of Ser. No. 921,310, Oct. 22, 1986, abandoned.

[30] Foreign Application Priority Data

Oct. 24, 1985 [JP] Japan .................................. 60-238372
Jan. 31, 1986 [JP] Japan ............................. 61-12772[U]
Jun. 24, 1986 [JP] Japan ............................. 61-96455[U]

[51] Int. Cl.$^5$ .......................... A23L 1/31; A23L 1/325
[52] U.S. Cl. .................................... 426/574; 426/641; 426/643; 426/516
[58] Field of Search ................. 426/574, 643, 516, 641

[56] References Cited

U.S. PATENT DOCUMENTS

| | | | |
|---|---|---|---|
| 4,439,456 | 3/1984 | Kammuri et al. | 426/574 X |
| 4,544,561 | 10/1985 | Komukai | 426/104 |
| 4,579,741 | 4/1986 | Hanson et al. | 426/574 X |
| 4,685,877 | 8/1987 | Harada | 426/516 |

FOREIGN PATENT DOCUMENTS

| | | |
|---|---|---|
| 1388844 | 2/1971 | United Kingdom . |
| 1465055 | 4/1976 | United Kingdom . |
| 1603861 | 6/1978 | United Kingdom . |

*Primary Examiner*—Marianne Cintins
*Attorney, Agent, or Firm*—Nixon & Vanderhye

[57] ABSTRACT

A textured proteinaceous food having a unique texture which is obtained in such a manner that a domestic animal meat or a marine animal meat or a minced meat of such animal is heated so as to gel to such an extent that the meat material does not lose its binding capacity, and the proteinaceous material in this gel state is force-extruded under pressure from a die having a predetermined configuration and a predetermined number of orifices. It is possible to obtain products having various kinds of cross-sectional pattern such as a honeycomb pattern and a rose-like pattern by employing appropriate dies.

6 Claims, 2 Drawing Sheets

A-1

B-1

A-2

B-2

C-1

C-2

D-1

D-2

E-1

E-2

TEXTURED PROTEINACEOUS FOOD

This is a continuation-in-part of application Ser. No. 06/921,310, filed Oct. 22, 1986, now abandoned.

BACKGROUND OF THE INVENTION

1. Field of the Invention

The present invention relates to a textured proteinaceous food which gives the consumer a novel and unique sensation of eating that cannot be obtained from any natural form of meat. More particularly, the present invention pertains to a textured proteinaceous food which has a novel and unique texture, the novel food being obtained in such a manner that meat of domestic or marine animals (i.e., fish or shellfish), or minced meat of such animals, is heated so as to gel, and the meat material in a gel state is extruded under pressure from a die having a plurality of orifices. The present invention is also concerned with a textured proteinaceous food which is provided with a unique cross-sectional pattern by extruding a raw material in a gel state from a die having orifices with a special configuration.

2. Description of the Related Art

Efforts have heretofore been made to texture a proteinaceous processed food in order to provide it with the capacity to give a specific sensation of eating. For example, one type of proteinaceous processed food has already been disclosed which is prepared in such a manner that a minced material, e.g., minced fish meat, is molded and heated so as to gel and then finely cut in the shape of fibers or flat pieces, and the finely cut material is then molded into a predetermined shape and heated to obtain a final product which gives the consumer the sensation of eating a crab, a lobster or the eye of a scallop (see the specification of Japanese Patent Public Disclosure No. 14552/1979).

A method of producing a food with fibrous texture similar to muscular fibers has also already been disclosed wherein salt is added to meat of a domestic or marine animal and kneaded to prepare a meat paste, which is then discharged into an aqueous protein denaturing solution from a nozzle having narrow orifices so that the material is spun, and single fibers thus obtained are gathered and heated to bind them together in the shape of a mass of meat having a fibrous texture (see the specification of Japanese Patent Public Disclosure No. 1903/1983).

Further, the copending U.S. patent application Ser. No. 872,497 now U.S. Pat. No. 4,685,877 discloses an extruding apparatus which may be used to prepare the product according to the present invention. However, this application discloses no process for producing a target product by a method employing a die such as that used in the present invention.

Conventional methods of producing processed foods generally aim at texturing a raw proteinaceous material so that a final product gives the sensation of eating a natural form of food, e.g., the leg meat of a crab, a lobster or the eye of a scallop. In contrast to this, the present invention aims at readily and inexpensively providing a proteinaceous processed food which gives the consumer a novel and unique sensation of eating that cannot be obtained from any natural form of meat food or which has a unique external appearance.

SUMMARY OF THE INVENTION

According to the present invention, the raw material employed is the meat of a marine animal such as a fish or shellfish, or a mixture of the meat of a marine animal and the meat of a domestic animal, and such raw proteinaceous material is heated so as to gel. In this case, the heat treatment must be carried out under such conditions that the raw proteinaceous material does not lose its binding capacity. Then, the proteinaceous material in a gel state is forced to be extruded under pressure from a die having a plurality of orifices with a predetermined configuration, thereby obtaining a product which has a unique texture and a desired unique configuration.

Thus, the product according to the present invention is prepared in such a manner that a raw material which has already been allowed to gel and yet has the required binding capacity is forced to be extruded from a die having a plurality of orifices. Therefore, a part of the product which has been extruded from one orifice has a uniform texture, while the product as a whole has a non-uniform texture, and since the binding capacity is still left in the product, the respective parts of the product which have been extruded from the plurality of orifices are bound together in the shape of a mass which gives the consumer a novel and extremely unique eating sensation. Accordingly, the product of the present invention can be employed as a novel and unique material for cooking or can be provided as a side dish or a food of delicate flavor by adding appropriate flavor and coloring.

According to the present invention, a material selected from marine animal meat, domestic animal meat and mixtures thereof is shaped, and the thus-shaped material is subjected to gelling by heating or allowing it to stand at room temperature or by cooling the material to effect gelation. The gelation is carried out to such an extent that the shaped material and the resulting gel state is self-supporting and retains its binding ability. In the gel state, the material can be extruded, and this is effected while the shaped material is in the gel state under pressure through a die having a plurality of orifices into smaller pieces which are then immediately bound to each other under pressure into a single mass having a predetermined cross-sectional pattern. The binding is facilitated by the binding ability of the pieces to form the single mass without using a binder.

Preferably, the protein aceous material in a gel state is force-extruded under pressure from a die having a multiplicity of staggered orifices with a circular, oval or hexagonal cross section, and extruded pieces of the material are compressed into a bundle. In consequence, the extruded pieces are bound with each other to provide a product having a honeycomb cross section. It has been found that it is possible to obtain a product having a honeycomb cross section spontaneously by compressing not only those pieces which have been extruded from a nozzle having hexagonal orifices but also those extruded from a nozzle having circular or oval orifices, thereby binding them into a bundle.

To prepare the product according to the present invention, it is possible to employ various kinds of die in which a plurality of orifices with an oval or elongated rectangular cross section are concentrically arranged, or such orifices may be arrayed in straight or curved lines. With such dies, it is possible to obtain products having a rose-like, lateral-striped or wavelike cross section (see the accompanying drawings).

DESCRIPTION OF THE PREFERRED EMBODIMENT

Figure 1:
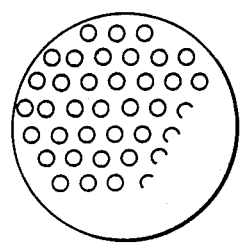
FIG. 1 is a perspective view of products A-2 and B-2 according to the present invention which are respectively obtained by the use of dies having orifices A-1 and B-1.
Figure 1:
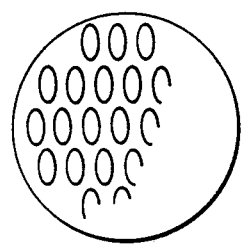
Figure 1:
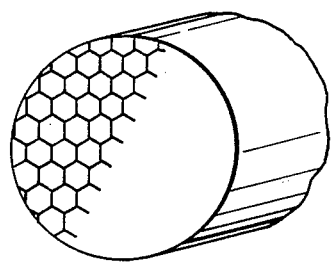
Figure 1:
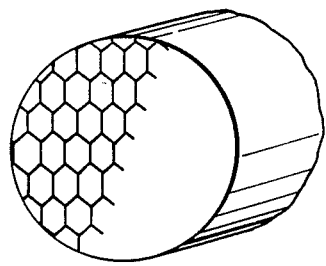

Examples of meat of marine animals which may be employed as a raw material for the product of the present invention include the meat of lobster, crab, cuttlefish and octopus, mackerel, cod, croaker and pike conger, as well as minced meat of the above-described marine animals. Fish meat or minced fish meat is particularly preferable from the viewpoint of obtaining a desirable eating sensation. In addition, domestic animal meat such as beef, pork or chicken may be employed in combination with marine animal meat.

When raw meat exclusive of minced meat is employed as a raw material, a lump of meat is cut into pieces of such a size that it may be readily charged into an extruder, and is then subjected to a curing or injection treatment with a salt solution. The treated material is then heated so as to be allowed to gel or denatured to such an extent that the raw meat material does not lose its binding capacity, and the material is then supplied to the extruder.

When minced fish meat is employed as a raw material, water is added to and thoroughly mixed with the minced fish meat under stirring, the water content being brought to a range of 0 to 120 wt % with respect to the weight of the minced fish meat, and is then molded into a predetermined configuration before being heated to become a gel. In general, gelation is carried out for about 24 hours at 0° to 25° C. (in the case of low-temperature gelation), or for 1 to 90 minutes at 25° to 100° C. (in the case of high-temperature gelation). The material obtained in a gel state is supplied to an extruder and extruded under pressure to obtain a final product.

Conditions for gelation of a raw material may appropriately be selected in accordance with the kind of product desired, the number and configuration of orifices in the die employed, etc.

Heating of a raw material in the present invention may be effected by a conventional method using, for example, microwaves, steam, an electric heater, a gas burner or hot water. The heating may be carried out before the raw material is supplied to the extruder. Alternatively, the heating may be effected while the raw material which has been supplied into the extruder is being transported to the die. In this case, a continuous extruder equipped with a microwave heater may preferably be employed.

Extrusion must be carried out under pressure since the raw material is in a gel state and is therefore inferior in fluidity. A piston extruder or a screw extruder may preferably be employed. The pressure which is applied during extrusion depends on the kind of raw material employed, the degree to which the material has gelled and the dimension, configuration and number of orifices in a die employed. However, the pressure is generally about 0.3 to 15 kg/cm$^2$. The dimension, configuration and number of orifices which are provided in a die may be selected as desired in accordance with the kind of final product desired. The cross-sectional configuration of orifices may be selected from various kinds of shape, e.g., a circular, oval, square, tortoiseshell, rectangular, triangular, star-shaped or cross-shaped configuration. The number of orifices may be selected in accordance with the kind of target product.

The percentage of the entire area of orifices in the die is generally 75% or less of the overall area of the die, preferably between 40% and 70%.

When a wire net cutting means made from a relatively thin wire is employed in place of the die according to the present invention, the material is cut rather than being extruded; the product thus obtained is therefore less coarse in texture than the product according to the present invention.

The rate at which a product is extruded from a die depends on the kind of product and the percentage orifice area in the employed die. However, the extrusion rate is generally 0.3 to 2 m/sec., preferably 1.0 to 2.0 m/sec.

Further, each orifice in a die may be tapered in the direction in which the material is extruded, so as to vary the dimensions of the inlet and outlet of the orifice, or the inlet and/or outlet portion may be chamfered to vary the pressure applied to the material being extruded.

The configuration of the product according to the present invention may be selected as desired, for example, a fibrous shape (in the shape of the leg of a crab, the eye of a scallop, etc.), a string-like shape, a block-like shape or a chrysanthemum shape.

In the product of the present invention, flavoring matter, coloring matter, spices and the like may be mixed into a raw material in advance, or such matter may be added to the extruded product by impregnation, spraying or other appropriate means. In addition, the extruded product may be further processed by, for example, heating or mixing with other materials.

The method according to the following Example 1 of the present invention was carried out using a die and a conventional wire net, the specifications of which are given below, and the products thus obtained were compared with each other by conducting a sensory test as to the eating sensation given by the two products.

| Wire net: | opening dimension | 1.5 × 1.5 mm |
| --- | --- | --- |
| | wire diameter | 0.7 mm |
| Die: | circular orifice | ⌀ 1.6 mm |
| | orifice spacing | 2 mm |
| | (orifice arrangement such as A-1 shown in FIG. 1) | |

| | Results of Sensory Test conducted by 10 skilled panelists | |
| --- | --- | --- |
| | Test items | |
| Products | Sensation of fibrous texture (The number of panelists who experienced a strong sensation of a fibrous texture) | Binding capacity |
| Preparing using wire net | 0 | 4 |
| Preparing using die | 10 | 6 |

As will be clear from the table above, although no significant difference was found between the two products as to the binding capacity, the product of the present invention obtained using the die gave a significantly strong sensation of having a fibrous texture in contrast to the product prepared using the wire net.

The following Examples are provided for further illustration of the present invention.

EXAMPLE 1

To 2000 g of minced walleye pollack meat, 40 g of salt, 40 g of scallop extract flavor, 80 g of potato starch and 1000 g of ice water were added and vigorously stirred for 40 minutes in a stirrer to prepare a minced fish meat paste. This paste was molded into a piece having a diameter of 35 mm and a thickness of 15 mm, and heated in a steamer at 40° C. for 8 minutes so as to become a gel. The material in this gel state was then put into a barrel having a diameter of 35 mm and a depth of 20 mm and equipped with a die having a diameter of 35 mm and 500 orifices with a diameter of 1.0 mm, and extruded while being pressed under a pressure of 5 kg/cm². The extruded product was heated in a steamer at 85° C. for 10 minutes. The texture, flavor and external appearance of the final product thus obtained were quite similar to those of the eyes of a scallop.

EXAMPLE 2

To a mixture of 1600 g of minced walleye pollack meat and 400 g of crab meat paste, 30 g of salt, 50 g of crab extra flavor, 60 g of potato starch, 20 g of wheat starch, 100 g of egg white and 700 g of ice water were added and vigorously stirred for 15 minutes in a small-sized cutting mixer to prepare a minced fish meat paste containing crab meat. This paste was packed in a casing with a diameter of 15 mm and a length of 20 cm and heated in hot water at 30° C. for 20 minutes. Then, the casing film was removed to obtain a minced fish meat gel containing crab meat.

This gel was then put into a barrel having a diameter of 17 mm and a depth of 25 cm and equipped with a die having a diameter of 17 mm and 90 orifices having a diameter of 1.5 mm, and extruded under a pressure of 5 kg/cm² in a manner similar to that in the preparation of "tokoroten" (gelidium jelly). Monascus pigment was then applied to the surface of the extruded gel and cut into a length of 10 cm before being heated in a steamer at 90° C. for 10 minutes. The product thus obtained was similar to the leg meat of a crab in elasticity, fibrous texture, flavor and external appearance.

EXAMPLE 3

To 100 g of minced walleye pollack meat, 30 g of salt, 10 g of monosodium glutamate, 40 g of sweet sake (a seasoning), 40 g of egg white, 15 g of sugar and 600 g of ice water were added and vigorously stirred for 30 minutes in a stirrer to prepare a fish meat paste. This paste was molded into a piece with a diameter of 80 mm and a thickness of 15 mm, which was then allowed to stand for 24 hours at 10° C. so as to become a gel.

The obtained gel was then put into a barrel having a diameter of 80 mm and a depth of 20 mm and equipped with a die with 1300 square orifices having a diameter of 1.5 mm, and extruded while being pressed under a pressure of 5 kg/cm². After the surface of the extruded gel had been rubbed by hand, the gel was heated in a steamer at 90° C. for 20 minutes. The paste product thus obtained had the external appearance of a chrysanthemum.

EXAMPLE 4

To a mixture of 700 g of chicken and 300 g of minced walleye pollack meat, 20 g of salt, 60 g of lard, 40 g of wheat starch, spices (1.5 g of white pepper, 1 g of nutmeg, 0.9 g of onion and 0.2 g of ginger), 20 g of sugar, 10 g of beef extract and 5 g of monosodium glutamate were added and vigorously stirred in a cutting mixer to prepare a uniform chicken paste. This paste was molded into a piece having a diameter of 60 mm and a thickness of 12 mm, and heated in a steamer at 35° C. for 15 minutes to become a gel.

The obtained gel was then put into a barrel having a diameter of 60 mm and a depth of 15 mm and equipped with a die with 85 orifices having a diameter of 5 mm, and extruded while being pressed under a pressure of 4 kg/cm². The extruded gel was heated in a frying pan so as to be roasted. The product thus obtained was a hamburger steak-like food in which relatively thick fibers were bound to each other.

EXAMPLE 5

To 2000 g of minced walleye pollack meat, 40 g of salt, 40 g of scallop extra flavor, 80 g of potato starch and 1000 g of ice water were added and vigorously stirred in a stirrer for 40 minutes to prepare a minced fish meat paste. This paste was molded into a piece with a diameter of 35 mm and a thickness of 15 mm, and heated in a steamer at 40° C. for 8 minutes to become a gel. The obtained gel was then put into a barrel having a diameter of 35 mm and a depth of 20 mm and equipped with a die having a diameter of 35 mm and provided with 500 orifices with a circular cross section arranged in a staggered pattern and having an orifice diameter of 1.0 mm, and then extruded while being pressed under a pressure of 5 kg/cm². The extruded gel was compressed and bound into a bundle, which was then heated in a steamer at 85° C. for 10 minutes. The product thus obtained had a honeycomb cross section, and the flavor and external appearance of the product were similar to those of the eye of a scallop. In addition, the product had a smooth texture such as that of the eye of a scallop.

EXAMPLE 6

Figure 2:
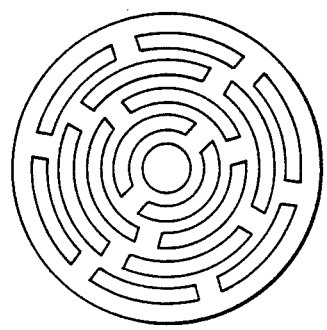
FIG. 2 is a sectional view of products C-2, D-2 and E-2 according to the present invention which are respectively obtained by the use of dies having orifices C-1, D-1 and E-1.
Figure 2:
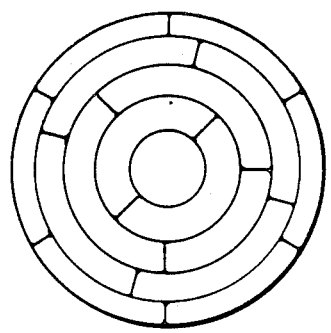
Figure 2:
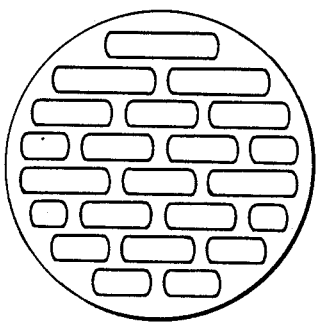
Figure 2:
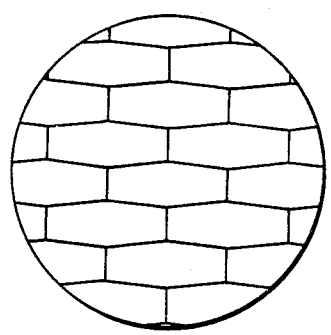
Figure 2:
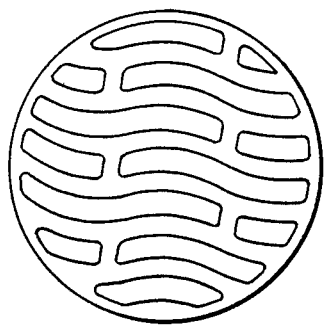
Figure 2:
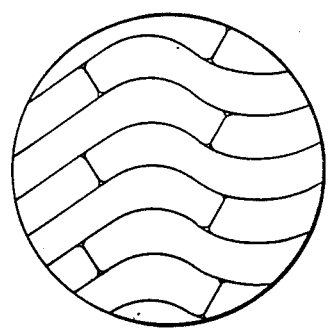

A paste product having a cross section C-2 as shown in FIG. 2 was prepared carrying out the same method as that employed in Example 5 except for employing a die C-1 as shown in FIG. 2. The obtained product had a fibrous texture and was mild as a whole.

EXAMPLE 7

A paste product having a cross section E-2 as shown in FIG. 2 was prepared by carrying out the same method as that shown in Example 5 except for employing a die E-1 as shown in FIG. 2. The obtained product had a fibrous texture and was mild as a whole.

What is claimed is:

1. A process for preparing a textured proteinaceous food product comprising the steps of:
   (a) shaping a material selected from the group consisting of a marine animal meat, a domestic animal meat and mixtures thereof to form a shaped material;
   (b) gelling said shaped material by heating or allowing it to stand at room temperature or under cooling to gel the material to such an extent that the shaped material in this gel state can then be extruded and such that the material retains its binding activity; and then (c) extruding the shaped material while in the gel state under pressure through a die having a plurality of orifices into pieces and immediately binding said pieces into a single mass having a predetermined cross-sectional pattern, said binding being performed by the binding ability of the shaped material without using a binder.

2. The process according to claim 1, in which the shaped material is heated in step (b) at a temperature ranging from 25° to 100° C. for 1 to 90 minutes.

3. A process according to claim 1, in which the shaped material is gelled in step (b) and left to stand at a temperature ranging from 0° to 25° C. for less than about 24 hours.

4. A process according to claim 1, in which the die orifices are circular or oval in shape and are arrayed in a hexagonal arrangement.

5. A process according to claim 1, in which the die orifices are oval or rectangular in shape and are arrayed in a straight, curved-line or concentric arrangement.

6. A process according to claim 1, wherein said die has a ratio of the total area of orifices ranging from 40% to 75% based on the overall area of said die.

* * * * *